United States Patent
Yamashita et al.

(10) Patent No.: US 12,215,191 B2
(45) Date of Patent: Feb. 4, 2025

(54) POLYALKYLENE ETHER GLYCOL COMPOSITION AND METHOD FOR PRODUCING THE SAME

(71) Applicant: Mitsubishi Chemical Corporation, Tokyo (JP)

(72) Inventors: Ryo Yamashita, Tokyo (JP); Yusuke Izawa, Tokyo (JP); Masaru Utsunomiya, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 587 days.

(21) Appl. No.: 17/453,190

(22) Filed: Nov. 2, 2021

(65) Prior Publication Data

US 2022/0056208 A1     Feb. 24, 2022

Related U.S. Application Data

(63) Continuation of application No. PCT/JP2019/026276, filed on Jul. 2, 2019.

(51) Int. Cl.
| | |
|---|---|
| *C08G 65/26* | (2006.01) |
| *C08G 18/48* | (2006.01) |
| *C08G 65/20* | (2006.01) |
| *C08G 65/30* | (2006.01) |
| *C08K 5/17* | (2006.01) |
| *C08K 5/20* | (2006.01) |
| *C09D 175/04* | (2006.01) |
| *D01F 6/70* | (2006.01) |
| *D01F 6/86* | (2006.01) |
| *D06N 3/14* | (2006.01) |

(52) U.S. Cl.
CPC ......... *C08G 65/2627* (2013.01); *C08G 18/48* (2013.01); *C08G 18/4854* (2013.01); *C08G 65/20* (2013.01); *C08G 65/30* (2013.01); *C09D 175/04* (2013.01); *D01F 6/70* (2013.01); *D01F 6/86* (2013.01); *D06N 3/14* (2013.01); *C08G 2650/50* (2013.01); *C08K 5/17* (2013.01); *C08K 5/20* (2013.01)

(58) Field of Classification Search
CPC .... C08G 65/2627; C08G 65/20; C08G 65/30; C08G 2650/50; C08G 18/4854; C08G 18/48; C08K 5/17; C08K 5/20; C09D 175/04; D01F 6/70; D01F 6/86; D06N 3/14

See application file for complete search history.

(56) References Cited

U.S. PATENT DOCUMENTS

| | | | |
|---|---|---|---|
| 4,480,124 A | 10/1984 | Mueller | |
| 5,269,961 A | 12/1993 | Tran | |
| 5,308,899 A | 5/1994 | Michaelis | |
| 5,422,415 A * | 6/1995 | Michaelis | ............ C08K 5/1535 524/109 |
| 5,695,689 A | 12/1997 | Gupta et al. | |
| 6,852,869 B2 | 2/2005 | Sigwart et al. | |
| 2004/0024172 A1 | 2/2004 | Sigwart et al. | |
| 2006/0258837 A1 * | 11/2006 | Haubner | ............ C08G 65/2666 528/403 |
| 2013/0296450 A1 | 11/2013 | Hofmann et al. | |
| 2017/0253698 A1 | 9/2017 | Taniguchi et al. | |

FOREIGN PATENT DOCUMENTS

| | | |
|---|---|---|
| EP | 0 543 778 A1 | 5/1993 |
| EP | 0 705 872 A2 | 4/1996 |
| JP | 61-036355 A | 2/1986 |
| JP | 04-306228 A | 10/1992 |
| JP | 06-200143 A | 7/1994 |
| JP | 08-503991 A | 4/1996 |
| JP | 2004-506763 A | 3/2004 |
| JP | 2014-503631 A | 2/2014 |
| JP | 2014-234394 A | 12/2014 |
| JP | 2017-025282 A | 2/2017 |
| JP | 2017-179363 A | 10/2017 |
| JP | 2019-108418 A | 7/2019 |
| JP | 2019-108419 A | 7/2019 |
| TW | 239153 B | 1/1995 |

OTHER PUBLICATIONS

Combined Chinese Office Action and Search Report issued Dec. 26, 2023 in Chinese Patent Application No. 201980097271.4 (with unedited computer-generated English translation), 11 pages.
Combined Taiwanese Office Action and Search Report issued Jan. 17, 2023, in corresponding Taiwanese Patent Application No. 108123453 (with English Translation and English Translation of Category of Cited Documents), 9 pages.
Korean Office Action dated Feb. 22, 2024 issued in Korean application 10-2021-7035521, with machine-generated translation, 14 pgs.
Extended European Search Report issued May 25, 2022 in European Patent Application No. 19935838.3, 8 pages.
Chinese Office Action issued May 1, 2024 in Chinese Patent Application No. 201980097271.4 (with unedited computer-generated English translation), 7 pages.
International Search Report issued Aug. 20, 2019 in PCT/JP2019/026276 filed on Jul. 2, 2019, 2 pages.

* cited by examiner

*Primary Examiner* — Rabon A Sergent
(74) *Attorney, Agent, or Firm* — Oblon, McClelland, Maier & Neustadt, L.L.P.

(57) ABSTRACT

A polyalkylene ether glycol composition containing a nitrogen-containing compound. The nitrogen-containing compound constitutes 0.2 to 40 mass ppm of the polyalkylene ether glycol in terms of nitrogen atoms, and the nitrogen-containing compound has a boiling point in a range of −40° C. to 120° C. at atmospheric pressure. An elastic stretchable fiber, a polyurethane, a synthetic leather, or a thermoplastic elastomer containing the polyalkylene ether glycol composition.

16 Claims, No Drawings

POLYALKYLENE ETHER GLYCOL COMPOSITION AND METHOD FOR PRODUCING THE SAME

CROSS REFERENCE TO RELATED APPLICATIONS

This application is a continuation of PCT/JP2019/026276, filed on Jul. 2, 2019, incorporated herein by reference.

TECHNICAL FIELD

The present invention relates to a polyalkylene ether glycol composition that can be a raw material for polyurethane, polyurethane urea, polyester, and the like and a method for producing the polyalkylene ether glycol composition.

BACKGROUND ART

Polyalkylene ether glycols, particularly polytetramethylene ether glycol (hereinafter sometimes abbreviated to PTMG), are used for polyester raw materials of thermosetting polyurethane, thermoplastic polyurethane, polyurethane urea, thermoplastic elastomers, and the like.

In a known method for producing PTMG, for example, tetrahydrofuran is subjected to ring-opening polymerization with acetic anhydride in the presence of a solid acid catalyst composed of a composite metal oxide, such as silica-alumina, to produce polytetramethylene ether glycol diacetate as a polytetramethylene ether glycol diester (hereinafter sometimes abbreviated to PTME), which is then hydrolyzed or transesterified with a lower alcohol in the presence of an alkaline catalyst to produce PTMG (Patent Literature 1).

A hydrogenation method using a heterogeneous catalyst is known as a method for improving the hue of PTMG. In this method, an acetal, which is a substance responsible for coloring, is decomposed and removed by hydrogenation (Patent Literature 2).

CITATION LIST

Patent Literature

PTL 1: JPH4-306228A
PTL 2: JP2004-506763A

The known method for improving hue has the problem that a polyalkylene ether glycol is easily decomposed and a monomer constituting the polyalkylene ether glycol is separated. A known method also has the problem that a catalyst does not work well and cannot efficiently decrease the acetal value.

SUMMARY OF INVENTION

It is an object of the present invention to provide a polyalkylene ether glycol composition with high thermal stability and high acetal value reducing efficiency.

Solution to Problem

The present inventors have made studies on the assumption that a trace amount of acid component or peroxide that cannot be removed by known purification techniques in a polyalkylene ether glycol causes an acid-catalyzed reaction or radical cleavage to convert part of the polyalkylene ether glycol into a cyclic ether. As a result, it has been found that a nitrogen-containing compound, particularly a nitrogen-containing compound with a specific structure, which has been considered to cause catalyst degradation, in a specific concentration range can prevent catalyst degradation during hydrogenolysis of an acetal, prevent conversion of the polyalkylene ether glycol into a cyclic ether, and consequently greatly improve the thermal stability of the polyalkylene ether glycol and the catalyst life during hydrogenation of the acetal.

The gist of the present invention includes the following [1] to [17].

[1] A polyalkylene ether glycol composition containing a nitrogen-containing compound, wherein
the nitrogen-containing compound constitutes 0.2 to 40 mass ppm of the polyalkylene ether glycol in terms of nitrogen atoms.

[2] The polyalkylene ether glycol composition according to [1], wherein the nitrogen-containing compound is at least one of amines and amides.

[3] The polyalkylene ether glycol composition according to [1] or [2], wherein the nitrogen-containing compound has a boiling point in the range of −40° C. to 120° C.

[4] The polyalkylene ether glycol composition according to any one of [1] to [3], wherein the nitrogen-containing compound is an amine having two or more nitrogen atoms.

[5] The polyalkylene ether glycol composition according to any one of [1] to [4], wherein the nitrogen-containing compound is an anion-exchange resin eluate.

[6] The polyalkylene ether glycol composition according to any one of [1] to [5], wherein the nitrogen-containing compound has a molecular weight in the range of 17 to 500.

[7] The polyalkylene ether glycol composition according to any one of [1] to [6], wherein the polyalkylene ether glycol composition further contains tetrahydrofuran, and the tetrahydrofuran constitutes 5 to 200 mass ppm of the polyalkylene ether glycol.

[8] The polyalkylene ether glycol composition according to any one of [1] to [7], wherein the polyalkylene ether glycol composition has an acetal value in the range of 0.01 to 3.00 mg-KOH/g.

[9] The polyalkylene ether glycol composition according to any one of [1] to [8], wherein the polyalkylene ether glycol composition has a peroxide concentration in the range of 0.01 to 200 μg-$H_2O_2$/g of the polyalkylene ether glycol.

[10] The polyalkylene ether glycol composition according to any one of [1] to [9], wherein the polyalkylene ether glycol composition has an acid value in the range of 0.02 to 1.00 mg-KOH/g.

[11] The polyalkylene ether glycol composition according to any one of [1] to [10], wherein the polyalkylene ether glycol composition has an antioxidant concentration in the range of 10 to 1000 mass ppm of the polyalkylene ether glycol.

[12] A method for producing the polyalkylene ether glycol composition according to any one of [1] to [11], comprising:
a purification step of decreasing the amount of acetal in the polyalkylene ether glycol composition.

[13] The method for producing the polyalkylene ether glycol composition according to [12], wherein the amount of acetal in the polyalkylene ether glycol composition is decreased with a solid catalyst in the purification step.

[14] An elastic stretchable fiber comprising the polyalkylene ether glycol composition according to any one of [1] to [11].

[15] A polyurethane comprising the polyalkylene ether glycol composition according to any one of [1] to [11].

[16] A synthetic leather comprising the polyalkylene ether glycol composition according to any one of [1] to [11].

[17] A thermoplastic elastomer comprising the polyalkylene ether glycol composition according to any one of [1] to [11].

Advantageous Effects of Invention

A polyalkylene ether glycol composition according to the prevent invention has high thermal stability, can prevent catalyst degradation during hydrogenation of an acetal, and can prevent catalyst poisoning in a downstream process even when used as a raw material for various derivatives.

DESCRIPTION OF EMBODIMENTS

The present invention is described in detail below. The present invention is not limited to the embodiments described below within the gist of the present invention.
[Polyalkylene Ether Glycol Composition]

A polyalkylene ether glycol composition according to the present invention contains a nitrogen-containing compound at a concentration in the range of 0.2 to 40 mass ppm of the polyalkylene ether glycol in terms of nitrogen atoms.

A polyalkylene ether glycol composition according to the present invention contains the nitrogen-containing compound at the above concentration in terms of nitrogen atoms, and contains, as impurities, an acetal and/or a peroxide, a cyclic ether, such as tetrahydrofuran, which is an unreacted raw material, and an optional additive agent, such as an antioxidant added to prevent oxidation, as described later.

A polyalkylene ether glycol composition according to the present invention may or may not contain a solvent. The polytetramethylene ether glycol content of a polyalkylene ether glycol composition according to the present invention is 5% or more by mass of the solid components other than the solvent.

The nitrogen-containing compound content, acetal value, tetrahydrofuran concentration, antioxidant concentration, and peroxide concentration of a polyalkylene ether glycol composition according to the present invention refer to concentrations relative to the polyalkylene ether glycol.

A polyalkylene ether glycol is a linear polyether glycol having primary hydroxy groups at both ends represented by the general formula HO—[$(CH_2)_n$O]$_m$—H (m denotes an integer of 2 or more, and n denotes an integer of 1 or more). As described later, a polyalkylene ether glycol is typically produced from a polytetramethylene ether glycol diester produced by ring-opening polymerization of a cyclic ether.

A polyalkylene ether glycol in a polyalkylene ether glycol composition according to the present invention may have any molecular weight. A polyalkylene ether glycol preferably has a number-average molecular weight (Mn) in the range of 250 to 4500, particularly preferably 650 to 3000, for various applications. The molecular weight of a polytetramethylene ether glycol can be adjusted by controlling the ring-opening polymerization reaction temperature and the ratio of the amount of carboxylic anhydride to the amount of the cyclic ether in a method for producing the polytetramethylene ether glycol described later.

A polyalkylene ether glycol typically has a molecular weight distribution (Mw/Mn) of 1 or more, preferably 1.2 or more, more preferably 1.5 or more, and typically 3 or less, preferably 2.5 or less, more preferably 2.2 or less.

The number-average molecular weight (Mn) of a polytetramethylene ether glycol is measured by a method described later in the example section. The same applies to the molecular weight distribution (Mw/Mn).

In a polyalkylene ether glycol composition according to the present invention, the concentration of the nitrogen-containing compound relative to the polyalkylene ether glycol in terms of nitrogen atoms is typically 0.2 mass ppm or more, preferably 0.3 mass ppm or more, more preferably 0.5 mass ppm or more, still more preferably 1 mass ppm or more, and typically 40 mass ppm or less, preferably 30 mass ppm or less, more preferably 25 mass ppm or less, still more preferably 20 mass ppm or less, particularly preferably 15 mass ppm or less, most preferably 10 mass ppm or less. When the concentration of the nitrogen-containing compound in terms of nitrogen atoms is in these ranges, the polyalkylene ether glycol composition is thermally stable, the acetal value can be easily and efficiently decreased, and the decomposition of the polyalkylene ether glycol is less likely to produce a cyclic ether or the like. In particular, it is possible to prevent a decrease in the degree of vacuum of a distillation column during purification of a polyalkylene ether glycol, to prevent deterioration in quality due to an increase in the amount of cyclic ether in a hydrogenation reaction, to prevent coloring when a polyurethane is produced from the polyalkylene ether glycol as described later, and to facilitate control of the urethane reaction rate.

The nitrogen-containing compound in a polyalkylene ether glycol composition according to the present invention is preferably at least one of amines and amides.

Preferred examples of the amines include amines represented by the following formula (1) (hereinafter also referred to as an "amine (1)").

[Chem. 1]

In the formula (1), $R^1$ to $R^3$ independently denote a hydrogen atom, an alkyl group, an alkenyl group, an aryl group, an alkoxy group (including an aryloxy group), a hydroxy group, an amino group, an alkylthio group, or an arylthio group. These groups may further have a substituent, and the substituent may have a heteroatom. $R^1$ to $R^3$ may be the same or different.

In the present invention, the amines include ammonia, that is, all $R^1$ to $R^3$ in the formula (1) may independently denote a hydrogen atom.

From the perspective of improving basicity, $R^1$ to $R^3$ preferably independently denote a hydrogen atom, an alkyl group, an aryl group, or an amino group.

The alkyl group of $R^1$ to $R^3$ is a chain (linear or branched) alkyl group or a cyclic alkyl group.

The chain alkyl group typically has 1 to 20 carbon atoms, preferably 1 to 12 carbon atoms. Specific examples of the chain alkyl group include a methyl group, an ethyl group, a n-propyl group, an i-propyl group, a n-butyl group, an i-butyl group, a sec-butyl group, a t-butyl group, a pentyl group, a hexyl group, an octyl group, and a decyl group.

The cyclic alkyl group typically has 3 to 20 carbon atoms, preferably 4 to 11 carbon atoms. Specific examples of the cyclic alkyl group include a cyclopentyl group, a cyclohexyl group, and a cyclooctyl group.

The alkyl group may have any substituent that does not significantly reduce the advantages of the present invention. Examples include an aryl group, an acyl group, a hydroxy group, an alkoxy group, an aryloxy group, an alkylaryloxy group, an amino group, an aminoalkyl group, and a sulfide group. These substituents typically have a molecular weight of approximately 200 or less. The substituent may have a heteroatom, such as oxygen, nitrogen, sulfur, or phosphorus.

The alkenyl group of $R^1$ to $R^3$ is a chain (linear or branched) alkenyl group or a cyclic alkenyl group.

The chain alkenyl group typically has 2 to 20 carbon atoms, preferably 2 to 12 carbon atoms. Specific examples of the chain alkenyl group include an ethenyl group, a 1-propenyl group, an isopropenyl group, a 2-butenyl group, a 1,3-butadienyl group, a 2-pentenyl group, and a 2-hexenyl group.

The cyclic alkenyl group typically has 3 to 20 carbon atoms, preferably 4 to 11 carbon atoms. Specific examples of the cyclic alkenyl group include a cyclopropenyl group, a cyclopentenyl group, and a cyclohexenyl group.

The alkenyl group may have any substituent that does not significantly reduce the advantages of the present invention. Examples include an aryl group, an acyl group, a hydroxy group, an alkoxy group, an aryloxy group, an alkylaryloxy group, an amino group, an aminoalkyl group, and a sulfide group. These substituents typically have a molecular weight of approximately 200 or less. The substituent may have a heteroatom, such as oxygen, nitrogen, sulfur, or phosphorus.

The aryl group of $R^1$ to $R^3$ typically has 5 to 20 carbon atoms, preferably 5 to 12 carbon atoms, and may be an aromatic hydrocarbon group or a heteroaromatic group (heteroaryl group) containing a heteroatom, such as oxygen, nitrogen, or sulfur.

The aryl group may have any substituent that does not significantly reduce the advantages of the present invention. Examples of the substituent include a halogen atom, an alkyl group having 1 to 10 carbon atoms, an acyl group having 1 to 10 carbon atoms, an alkoxy group having 1 to 10 carbon atoms, a cycloalkyl group having 1 to 10 carbon atoms, an aryl group having 6 to 10 carbon atoms, an aryloxy group having 6 to 10 carbon atoms, an alkylaryl group having 7 to 12 carbon atoms, an alkylaryloxy group having 7 to 12 carbon atoms, an arylalkyl group having 7 to 12 carbon atoms, an arylalkoxy group having 7 to 12 carbon atoms, and a hydroxy group. The substituent may have a heteroatom, such as oxygen, nitrogen, sulfur, or phosphorus.

Specific examples of the aryl group include a phenyl group, a benzyl group, a mesityl group, a naphthyl group, a 2-methylphenyl group, a 3-methylphenyl group, a 4-methylphenyl group, a 2,3-dimethylphenyl group, a 2,4-dimethylphenyl group, a 2,5-dimethylphenyl group, a 2,6-dimethylphenyl group, a 2-ethylphenyl group, a 2-isopropylphenyl group, a 2-t-butylphenyl group, a 2,4-di-t-butylphenyl group, a 2-chlorophenyl group, a 3-chlorophenyl group, a 4-chlorophenyl group, a 2,3-dichlorophenyl group, a 2,4-dichlorophenyl group, a 2,5-dichlorophenyl group, a 3,4-dichlorophenyl group, a 3,5-dichlorophenyl group, a 4-trifluoromethylphenyl group, a 2-methoxyphenyl group, a 3-methoxyphenyl group, a 4-methoxyphenyl group, a 3,5-dimethoxyphenyl group, a 4-cyanophenyl group, a 4-nitrophenyl group, a 4-aminophenyl group, a trifluoromethylphenyl group, a pentafluorophenyl group, an isoxazolyl group, an isothiazolyl group, an imidazolyl group, an oxazolyl group, a thiazolyl group, a thiadiazolyl group, a thienyl group, a thiophenyl group, a triazolyl group, a tetrazolyl group, a pyridyl group, a pyrazinyl group, a pyrimidinyl group, a pyridazinyl group, a pyrazolyl group, a pyrrolyl group, a pyranyl group, a furyl group, a furazanyl group, an imidazolidinyl group, an isoquinolyl group, an isoindolyl group, an indolyl group, a quinolyl group, a pyridothiazolyl group, a benzimidazolyl group, a benzoxazolyl group, a benzothiazolyl, benzotriazolyl group, a benzofuranyl group, an imidazopyridinyl group, a triazopyridinyl group, and a purinyl group.

The alkoxy group (including an aryloxy group) of $R^1$ to $R^3$ typically has 1 to 20 carbon atoms, preferably 1 to 12 carbon atoms. Specific examples of the alkoxy group include a methoxy group, an ethoxy group, a butoxy group, and a phenoxy group.

The alkoxy group may have any substituent that does not significantly reduce the advantages of the present invention. Examples include an aryl group, an acyl group, a hydroxy group, an alkoxy group, an aryloxy group, an alkylaryloxy group, an amino group, an aminoalkyl group, and a sulfide group. These substituents typically have a molecular weight of approximately 200 or less. The substituent may have a heteroatom, such as oxygen, nitrogen, sulfur, or phosphorus.

The amino group of $R^1$ to $R^3$ typically has 0 to 20 carbon atoms, preferably 0 to 12 carbon atoms. Specific examples of the amino group include a methylamino group, an ethylamino group, a propylamino group, a butylamino group, a dimethylamino group, a diethylamino group, an anilino group, a toluidino group, an anisidino group, a diphenylamino group, and an N-methyl-N-phenylamino group.

The amino group may have any substituent that does not significantly reduce the advantages of the present invention. Examples include an aryl group, an acyl group, a hydroxy group, an alkoxy group, an aryloxy group, an alkylaryloxy group, an amino group, an aminoalkyl group, and a sulfide group. These substituents typically have a molecular weight of approximately 200 or less. The substituent may have a heteroatom, such as oxygen, nitrogen, sulfur, or phosphorus.

The alkylthio group of $R^1$ to $R^3$ typically has 1 to 20 carbon atoms, preferably 1 to 12 carbon atoms. Specific examples of the alkylthio group include a methylthio group, an ethylthio group, a propylthio group, and an isopropylthio group.

The alkylthio group may have any substituent that does not significantly reduce the advantages of the present invention. Examples include an aryl group, an acyl group, a hydroxy group, an alkoxy group, an aryloxy group, an alkylaryloxy group, an amino group, an aminoalkyl group, and a sulfide group. These substituents typically have a molecular weight of approximately 200 or less. The substituent may have a heteroatom, such as oxygen, nitrogen, sulfur, or phosphorus.

The arylthio group of $R^1$ to $R^3$ typically has 6 to 20 carbon atoms, preferably 6 to 12 carbon atoms. Specific examples of the arylthio group include a phenylthio group and a tolylthio group.

The arylthio group may have any substituent that does not significantly reduce the advantages of the present invention. Examples include an aryl group, an acyl group, a hydroxy group, an alkoxy group, an aryloxy group, an alkylaryloxy group, an amino group, an aminoalkyl group, and a sulfide group. These substituents typically have a molecular weight of approximately 200 or less. The substituent may have a heteroatom, such as oxygen, nitrogen, sulfur, or phosphorus.

$R^1$ and $R^2$, $R^2$ and $R^3$, and $R^3$ and $R^1$ may be linked to form a ring.

Specific examples of the amine (1) include ammonia, primary amines, such as methylamine, ethylamine, butylamine, octylamine, nonylamine, 1-aminodecane, aniline, and phenethylamine; secondary amines, such as dimethylamine, diethylamine, dibutylamine, dipentylamine, dihexylamine, diheptylamine, dicyclohexylamine, and N-methylaniline; tertiary amines, such as trimethylamine, triethylamine, tributylamine, tripentylamine, and N,N-dimethylaniline; oximes, such as acetaldoxime; diamines, such as 1,3-propanediamine and N,N-dimethyl-1,6-hexanediamine; 5-membered ring amines, such as N-butylpyrrole, N-butyl-2,3-dihydropyrrole, N-butylpyrrolidine, and 2,3-dihydro-1H-indole; 6-membered ring amines, such as 4-aminomethylpiperidine, 4-dimethylaminopyridine, 1,2,3,4-tetrahydroquinoline, 4-amino-5,6-dihydro-2-methylpyrimidine, 2,3,5,6-tetramethylpyrazine, and 3,6-dimethylpyridazine; and a polymer having 2 or more, preferably 3 to 20, constitutional units derived from a nitrogen-containing compound represented by the formula (1) as a linear aliphatic hydrocarbon having 2 or more primary amino groups bonded thereto eluted from an anion-exchange resin. These are preferred from the perspective of basicity.

Examples of the amine (1) having an oxygen atom include chain amino alcohols, such as ethanolamine, N,N-dimethylethanolamine, 4-aminobutanol, and 2-aminobutanol; and cyclic amines, such as 2-ethylmorpholine, N-methoxycarbonyl morpholine, prolinol, 3-hydroxypiperidine, 4-hydroxypiperidine, tetrahydrofurfuryl amine, and 3-aminotetrahydropyran.

The amine (1) is preferably an amine having two or more nitrogen atoms from the perspective of preventing the decomposition of polyalkylene ether glycol. Preferred examples of the amine (1) include methylenediamine, ethylenediamine, butylenediamine, and pyrazine.

The nitrogen-containing compound may be finally removed from a polyalkylene ether glycol composition by distillation. Thus, the amine (1) is preferably a compound with a boiling point temperature in the range of −40° C. to 120° C. at atmospheric pressure. Preferred examples of such an amine (1) include ammonia, methylamine, ethylamine, butylamine, dimethylamine, diethylamine, trimethylamine, acetaldoxime, and ethylenediamine.

Examples of the amides include amides represented by the following formula (2) (hereinafter also referred to as an "amide (2)"), preferably carboxylic acid amides.

[Chem. 2]

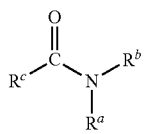

(2)

Examples of the carboxylic acid amides include primary amides, secondary amides, and tertiary amides. The number of substituents on the N atom in the carboxylic acid amides ranges from 0 to 2. Examples include N-alkyl-substituted amides, N-alkenyl-substituted amides, and N-aryl-substituted amides. In other words, one or both of the substituents $R^a$ and $R^b$ of the carboxylic acid amides are an alkyl group, an alkenyl group, or an aryl group.

The substituents $R^a$ and $R^b$ may contain a heteroatom, and the substituents $R^a$ and $R^b$ may be the same or different.

Examples of the substituent $R^c$ on the carbonyl group include a hydrogen atom, an alkyl group, an alkenyl group, and an aryl group.

The substituents $R^a$ to $R^c$ may be linked to form a ring.

From the perspective of preventing side reactions, decomposition, and the like, the substituent $R^c$ on the carbonyl group is preferably an alkyl group.

More specifically, the amide (2) is preferably a chain amide, such as acetamide, N-methylacetamide, N-ethylacetamide, N,N-dimethylacetamide, or succinic acid amide; an aromatic amide, such as benzamide; or a cyclic amide, such as 2-pyrrolidone, N-methylpyrrolidone, N-ethylpyrrolidone, N-vinylpyrrolidone, 2-piperidone, or N-methylpiperidone, from the perspective of the stability of the compound.

The amide (2) is more preferably acetamide, N-methylacetamide, 2-pyrrolidone, or N-methylpyrrolidone from the perspective of its moderate boiling point and high stability. Among these, 2-pyrrolidone and N-methylpyrrolidone are particularly preferred.

The nitrogen-containing compound in a polyalkylene ether glycol composition according to the present invention typically has a molecular weight in the range of 17 to 500, particularly preferably 17 to 300, particularly preferably 17 to 200, from the perspective of the prevention of deposition on a catalyst used for purification or the like of the polyalkylene ether glycol and the ease of removal by distillation or the like. A nitrogen-containing compound with a molecular weight equal to or higher than the lower limit may be prevented from volatilizing in the process. A nitrogen-containing compound with a molecular weight equal to or lower than the upper limit is preferred because it can be prevented from depositing on a catalyst used for purification or the like of a polyalkylene ether glycol and can be separated by distillation.

Examples of amines having two or more nitrogen atoms satisfying the preferred boiling point and the molecular weight of the nitrogen-containing compound include ethylenediamine and pyrazine.

A polyalkylene ether glycol composition according to the present invention may contain only one of these amines and amides as a nitrogen-containing compound, may contain two or more of these amines and amides, and may contain both one of the amines and one of the amides.

A polyalkylene ether glycol composition according to the present invention further contains tetrahydrofuran. The tetrahydrofuran content of a polyalkylene ether glycol composition according to the present invention is typically 5 mass ppm or more, particularly preferably 10 mass ppm or more, particularly preferably 50 mass ppm or more, and typically 500 mass ppm or less, particularly preferably 200 mass ppm or less, of the polyalkylene ether glycol. A tetrahydrofuran content higher than the upper limit may result in a decrease in the degree of vacuum of a vacuum distillation column in vacuum distillation for purification or the like of the polyalkylene ether glycol or may result in deteriorated work environment when the polyalkylene ether glycol is used as a raw material for urethane or the like because tetrahydrofuran acts as a volatile component. A tetrahydrofuran content below the lower limit may require excessive purification.

A polyalkylene ether glycol composition according to the present invention typically has an acetal value of 0.01 mg-KOH/g or more, particularly preferably 0.05 mg-KOH/g or more, particularly preferably 0.10 mg-KOH/g or more, and typically 3.00 mg-KOH/g or less, particularly preferably 2.50 mg-KOH/g or less, particularly preferably 2.00 mg-KOH/g or less. The polyalkylene ether glycol composition preferably has an acetal value equal to or lower than the upper limit, because a cross-linking reaction starting from an acetal can be prevented when the polyalkylene ether glycol is used as a raw material for urethane or the like. An acetal value below the lower limit may require excessive purification.

The concentration in terms of nitrogen atoms, the tetrahydrofuran content, and the acetal value of a nitrogen-containing compound in a polyalkylene ether glycol composition according to the present invention are determined by methods described later in the example section.

A polyalkylene ether glycol composition according to the present invention typically has a peroxide concentration of 0.01 µg-$H_2O_2$/g or more, preferably 0.05 µg-$H_2O_2$/g or more, more preferably 0.10 µg-$H_2O_2$/g or more, particularly preferably 0.50 µg-$H_2O_2$/g or more, and typically 200 µg-$H_2O_2$/g or less, preferably 175 µg-$H_2O_2$/g or less, more preferably 150 µg-$H_2O_2$/g or less. An excessively high peroxide concentration undesirably results in an excessively high acetal value or carbonyl value and tends to result in accelerated oxidative catalyst degradation and accelerated formation of a cyclic ether by a radical. A peroxide concentration below the lower limit may require excessive purification.

A polyalkylene ether glycol composition according to the present invention may contain one or two or more of peroxides with a peroxy group formed by oxidizing a chain ether moiety of the polyalkylene ether glycol and peroxides with a peroxy group formed by oxidizing a cyclic ether moiety of tetrahydrofuran. The polyalkylene ether glycol composition typically contains a peroxide derived from the oxidation of the chain ether moiety of the polyalkylene ether glycol.

The concentration of peroxide in a polyalkylene ether glycol composition can be measured by a method of reacting the peroxide with potassium iodide and titrating liberated iodine with sodium thiosulfate or the like.

A polyalkylene ether glycol composition according to the present invention typically has an acid value of 0.02 mg-KOH/g or more, preferably 0.03 mg-KOH/g or more, more preferably 0.05 mg-KOH/g or more, still more preferably 0.07 mg-KOH/g or more, and typically 1.00 mg-KOH/g, preferably 0.80 mg-KOH/g, more preferably 0.60 mg-KOH/ g, still more preferably 0.50 mg-KOH/g. An excessively high acid value undesirably results in an excessively high acetal value or carbonyl value and tends to result in accelerated oxidative catalyst degradation and accelerated formation of a cyclic ether by a radical. An acid value below the lower limit may require excessive purification.

Examples of a compound having an effect on the acid value include organic carboxylic acids, such as formic acid, acetic acid, and butyric acid, and inorganic acids, such as phosphoric acid, contained in a polyalkylene ether glycol composition.

The acid value of a polyalkylene ether glycol composition can be measured by alkalimetry.

In a polyalkylene ether glycol composition according to the present invention, an antioxidant is added to avoid the problems caused by oxidation, and the concentration of the antioxidant is typically 10 mass ppm or more, particularly preferably 50 mass ppm or more, particularly preferably 100 mass ppm or more, of the polyalkylene ether glycol. The upper limit of the antioxidant concentration is typically 1000 mass ppm or less, preferably 500 mass ppm or less, more preferably 300 mass ppm or less, of a polyalkylene ether glycol. An excessively high antioxidant concentration results in a blockage due to solid deposition in the process. An excessively low antioxidant concentration undesirably results in insufficient prevention of the oxidation reaction.

From the perspective of effects and stability, the antioxidant is preferably 2,6-di-tert-butyl-p-cresol (BHT).

A polyalkylene ether glycol composition according to the present invention is produced by a method for producing a polyalkylene ether glycol composition described later preferably using a polyalkylene ether glycol composition containing a nitrogen-containing compound and through the step of decreasing the amount of acetal. The step of decreasing the amount of acetal is preferably the step of decreasing the amount of acetal in a polyalkylene ether glycol composition using a solid catalyst.

A polyalkylene ether glycol composition according to the present invention may contain a nitrogen-containing compound by any method, for example, by a method of adding the nitrogen-containing compound to a produced polyalkylene ether glycol at the above concentration in terms of nitrogen atoms, or by a method of producing a polytetramethylene ether glycol containing the nitrogen-containing compound using a material containing the nitrogen-containing compound as a raw material for the polytetramethylene ether glycol, as described later in the example section.

[Method for Producing Polyalkylene Ether Glycol Composition]

A polyalkylene ether glycol may be produced by any method. Preferably, in the usual manner, a diester of a polytetramethylene ether glycol is produced by a ring-opening polymerization reaction of a cyclic ether (or a derivative thereof, as described later), and a polytetramethylene ether glycol is produced by a hydrolysis or transesterification reaction of the diester of the polytetramethylene ether glycol.

<Cyclic Ether>

Any cyclic ether or its derivative may be used as a raw material for a ring-opening polymerization reaction in the production of a polytetramethylene ether glycol. The number of carbon atoms constituting the cyclic ether typically ranges from 2 to 10, preferably 3 to 7.

Specific examples of the cyclic ether include tetrahydrofuran (THF), ethylene oxide, propylene oxide, oxetane, tetrahydropyran, oxepane, and 1,4-dioxane.

The cyclic ether may be a cyclic ether derivative in which part of hydrogen atoms of a hydrocarbon group constituting the ring are substituted with an alkyl group, a halogen atom, or the like. Specific examples of the cyclic ether include 3-methyltetrahydrofuran and 2-methyltetrahydrofuran.

The cyclic ether may be used alone or as a mixture of two or more cyclic ethers and is preferably used alone.

Among these cyclic ethers, THF is preferred in terms of reactivity and industrial demands for a polyalkylene ether glycol to be produced.

THF can be produced by a known production method. THF can be produced, for example, by an acetoxylation reaction of raw materials butadiene, acetic acid, and oxygen to produce an intermediate diacetoxybutene, hydrogenation and hydrolysis of the diacetoxybutene to produce 1,4-butanediol, and cyclodehydration of the 1,4-butanediol to produce THF; by hydrogenation of raw materials maleic acid, succinic acid, maleic anhydride, and/or fumaric acid to produce 1,4-butanediol, and cyclodehydration of the 1,4-butanediol to produce THF; by a contact between a raw material acetylene and an aqueous formaldehyde solution to produce butynediol, hydrogenation of the butynediol to produce 1,4-butanediol, and cyclodehydration of the 1,4- butanediol to produce THF; by oxidation of propylene to produce 1,4-butanediol and cyclodehydration of the 1,4-butanediol to produce THF; by hydrogenation of succinic acid produced by a fermentation method to produce 1,4-butanediol and cyclodehydration of the 1,4-butanediol to produce THF; or by cyclodehydration of 1,4-butanediol produced by direct fermentation from biomass, such as sugar.

<Carboxylic Anhydride>

In a ring-opening polymerization reaction of a cyclic ether, a carboxylic anhydride may be used as an auxiliary agent (polymerization initiator). The carboxylic anhydride may be a carboxylic anhydride derived from an aliphatic or aromatic carboxylic acid typically having 2 to 12 carbon atoms, preferably 2 to 8 carbon atoms. A carboxylic acid used as a raw material for an anhydride is preferably a monocarboxylic acid but may be a polycarboxylic acid.

Specific examples of the carboxylic acid include aliphatic carboxylic acids, such as acetic acid, propionic acid, butyric acid, valeric acid, caproic acid, heptanoic acid, caprylic acid, pelargonic acid, maleic acid, and succinic acid; and aromatic carboxylic acids, such as benzoic acid, phthalic acid, and naphthalene acid.

Among these carboxylic anhydrides, anhydrides derived from aliphatic carboxylic acids are preferred in terms of price and availability, and acetic anhydride is preferably used from the perspective of reactivity and supply and demand of a polyalkylene ether glycol to be produced.

The amount of carboxylic anhydride to be used is, but not limited to, typically 3% or more by mole, preferably 4% or more by mole, more preferably 5% or more by mole, and typically 30% or less by mole, preferably 28% or less by mole, more preferably 26% or less by mole, still more preferably 25% or less by mole, of the total amount of raw material cyclic ether (or a derivative thereof). An excessively large amount of carboxylic anhydride to be used tends to result in coloring due to the carboxylic anhydride during a ring-opening polymerization reaction or in a heating process after a ring-opening polymerization reaction and may result in the production of a polyalkylene ether glycol diester with poor hue. An excessively small amount of carboxylic anhydride to be used may result in an insufficient ring-opening polymerization rate and the production of a polyalkylene ether glycol diester with insufficient productivity.

<Polymerization Catalyst>

A polymerization catalyst is typically used in a ring-opening polymerization reaction of a cyclic ether.

The polymerization catalyst may be any acid catalyst capable of a ring-opening polymerization of a cyclic ether. A known method uses a strong acid catalyst, such as fluorosulfuric acid, and is commercially available. The polymerization catalyst is more preferably a Lewis acidic solid acid catalyst.

The solid acid catalyst is preferably a solid acid catalyst composed of a metal oxide.

A metal oxide composed of a group 3, 4, 13, or 14 metal element of the periodic table (in the present invention, the periodic table refers to the periodic table of revised IUPAC Nomenclature of Inorganic Chemistry (1998)) or a composite oxide containing one of these metal elements is preferably used as a catalytic metal. More specifically, metal oxides, such as yttrium oxide, titania, zirconia, alumina, and silica; and composite oxides, such as zirconia silica, hafnia silica, silica alumina, titania silica, and titania zirconia, are preferred. These composite oxides may further contain another metal element.

A solid acid catalyst used in the present invention is prepared, for example, by adding an acid, an alkali, or water, if necessary, to a mixed solution containing a salt of at least one metal selected from the group 3, 4, 13, and 14 metal elements of the periodic table or an alkoxide thereof to form a precipitate or gel as a solid acid catalyst precursor. The precipitate or gel may be formed by a coprecipitation method, a sol-gel method, a kneading method, an impregnation method, or the like.

In the present invention, a solid acid catalyst precursor is preferably prepared by supporting a metal salt and/or a metal alkoxide on a suitable carrier and bringing the metal salt and/or the metal alkoxide into contact with a basic material, such as an alkali or amine, in a solid phase state (in a substantially water-free state).

The solid acid catalyst precursor thus prepared is, if necessary, filtered, washed, and/or dried, and is then fired in an atmosphere of an inert gas, such as nitrogen or argon, or in an atmosphere of an oxidizing gas, such as air or diluted oxygen gas, to produce a desired oxide or composite oxide. The heating and firing temperature typically ranges from 600° C. to 1150° C., preferably 700° C. to 1000° C. A solid acid catalyst with high activity and stability can be produced by firing in this temperature range.

The amount of polymerization catalyst to be used in the ring-opening polymerization reaction depends on the reaction type, a fixed bed or a suspended bed, or a continuous reaction or a batch reaction. For a suspension bed continuous reaction, the amount of polymerization catalyst to be used typically ranges from 0.001% to 50% by mass, preferably 0.01% to 30% by mass, particularly preferably 0.1% to 20% by mass, of the whole compounds in the reaction system.

<Ring-Opening Polymerization Reaction>

A polyalkylene ether glycol diester can be produced by a ring-opening polymerization reaction of the cyclic ether and the carboxylic anhydride using an acid catalyst as a ring-opening polymerization catalyst. The polyalkylene ether glycol diester thus produced can be converted into a polyalkylene ether glycol by a known method, such as a hydrolysis reaction or a transesterification reaction.

For example, THF is used as a cyclic ether to produce PTME. PTMG can be produced by mixing PTME with an aliphatic alcohol having 1 to 4 carbon atoms and performing transesterification by an alcoholysis reaction in the presence of a transesterification catalyst.

A reactor for the ring-opening polymerization reaction is, but not limited to, a generally used reactor, such as a tank reactor or a column reactor. Any known reaction process may be used. Specific examples of the reaction process include a process of charging and polymerizing a cyclic ether, a carboxylic anhydride, and a polymerization catalyst in a reactor (a batch process); and a process of continuously supplying a cyclic ether, a carboxylic anhydride, and a polymerization catalyst such that certain amounts of the cyclic ether, the carboxylic anhydride, and the polymerization catalyst are present in a reactor, and simultaneously continuously extracting a reaction liquid containing a polyalkylene ether glycol diester as a desired product (a continuous process). Among these, the continuous process is preferred in terms of high productivity.

A ring-opening polymerization reaction temperature in the present invention may be in any known range and is typically 25° C. or more, preferably 30° C. or more, more preferably 33° C. or more, and typically 66° C. or less, preferably 60° C. or less, more preferably 49° C. or less. A ring-opening polymerization reaction temperature above the upper limit temperature may result in quality deterioration, such as more coloring of the polyalkylene ether glycol diester. A ring-opening polymerization reaction temperature below the lower limit temperature tends to result in not only lower productivity due to a lower yield but also an increased cost of recovering unreacted raw materials (which mean unreacted cyclic ether and carboxylic anhydride used as raw materials).

The ring-opening polymerization reaction temperature in the present invention means the temperature of liquid in a reactor.

The ring-opening polymerization reaction pressure may be any pressure at which the reaction system can maintain a liquid phase and typically ranges from normal pressure to 10 MPa, preferably normal pressure to 5 MPa.

The ring-opening polymerization reaction time typically ranges from 0.1 to 20 hours, preferably 0.5 to 15 hours, from the perspective of the polyalkylene ether glycol diester yield and economic efficiency.

The reaction time means in the batch process the time from when the reaction temperature is reached until the reaction is completed and cooling is started, and means in the continuous process the residence time of the polymerization reaction liquid in the reactor.

If necessary, the present invention may include the step of recovering an unreacted raw material from a reaction liquid, the step of purifying and hydrolyzing a produced polyalkylene ether glycol diester, the step of purifying a polyalkylene ether glycol, the step of regenerating a catalyst, and the like at latter stages of the reactor.

In the batch reaction process, after completion of the reaction, only a polymer can be easily obtained by first filtering and separating the catalyst and the reaction liquid and then distilling off unreacted raw materials from the reaction liquid. The activity of the catalyst after the reaction can be easily recovered by sufficiently washing the catalyst and then burning adhered organic matters.

The step of separating and recovering unreacted raw materials may be any known method using a gas-liquid separator or a gas-liquid contactor. The step of separating and recovering unreacted raw materials preferably includes the step of supplying a reaction liquid containing a polyalkylene ether glycol diester to a gas-liquid contactor to separate and recover the unreacted raw materials. The step of separating and recovering unreacted raw materials may be performed alone or may be performed in combination with another step of separating and recovering the unreacted raw materials. The gas-liquid contactor means a device used in the step of bringing an inert gas into contact with a reaction liquid containing a polytetramethylene ether glycol diester.

<Hydrolysis or Transesterification Reaction>

To convert a polyalkylene ether glycol diester into a polyalkylene ether glycol, a polytetramethylene ether glycol diester is hydrolyzed in the presence of a catalyst or is subjected to a transesterification reaction with a lower alcohol.

The catalyst may be any known catalyst used in a hydrolysis reaction or a transesterification reaction. The catalyst is typically an alkali metal alkoxide, such as lithium, sodium, potassium, cesium, or rubidium. Among these, sodium and potassium alkoxides are preferably used. Specific examples of the catalyst include sodium methoxide, sodium ethoxide, sodium isopropoxide, potassium methoxide, potassium ethoxide, and potassium isopropoxide. Sodium methoxide is more preferred due to its versatility and low cost.

The lower alcohol used in the transesterification reaction of the polytetramethylene ether glycol diester is an aliphatic alcohol having 1 to 4 carbon atoms, such as methanol or ethanol. Among these, methanol is suitably used from the perspective of the reaction rate of the transesterification reaction. The lower alcohol is typically used in an amount in the range of approximately 10% to 500% by mass of the polytetramethylene ether glycol dies ter.

The hydrolysis reaction or transesterification reaction is typically performed at normal pressure or under pressure. The reaction pressure typically ranges from 0.1 to 2.0 MPa, preferably 1.0 to 1.5 MPa.

The reaction temperature in the hydrolysis reaction or transesterification reaction typically ranges from 60° C. to 180° C.

<Purification of Crude Poly(Tetramethylene Ether) Glycol>

A crude polyalkylene ether glycol produced by a hydrolysis or transesterification reaction of a polyalkylene ether glycol diester may be purified by any method. Examples of the purification method include a method of removing organic impurities and oligomers, typically dimers to pentamers, by distillation, a method of removing water-soluble substances by extraction, and a method of decreasing the acetal value, carbonyl value, and coloration by hydrogenation. These purification methods may be used alone or in combination. The present invention preferably includes a method of decomposing an acetal by hydrogenation to decrease the acetal value, carbonyl value, and coloring.

Examples of a hydrogenation catalyst used for hydrogenation of a crude polytetramethylene ether glycol include homogeneous catalysts containing one or two or more of the group 8 to 11 metal elements of the periodic table, that is, iron (Fe), ruthenium (Ru), osmium (Os), cobalt (Co), rhodium (Rh), iridium (Ir), nickel (Ni), palladium (Pd), platinum (Pt), copper (Cu), silver (Ag), and gold (Au), and solid catalysts containing these metal elements supported on a carrier. Among these, the group 10 metal elements of the periodic table are preferred, and palladium solid catalysts are most preferred in terms of catalyst cost and catalytic activity.

The form of the group 8 to 11 metal elements of the periodic table in the solid catalysts may be any one of a single metal, an oxide, a hydroxide, and various salts. When the ratio of an oxide or the like to a single metal is high, a conversion treatment into a single metal by a reductive activation treatment with hydrogen gas may be performed in advance before starting the reaction, or the reaction may be started without such a treatment. Hydrogen gas is introduced into a hydrogenation reaction system, and such an oxide or the like is reduced to an active metal element in the reaction.

The carrier is preferably one or two or more of silica, alumina, titania, zirconia, activated carbon, graphite, diatomaceous earth, and the like. Among these, silica and/or diatomaceous earth and the like are preferred, and silica is particularly preferred.

The amount of metal element component belonging to the groups 8 to 11 of the periodic table in the solid catalysts is typically 0.1% or more by mass, preferably 0.5% or more by mass, particularly preferably 1% or more by mass, and typically 80% or less by mass, preferably 20% or less by mass, particularly preferably 10% or less by mass. The amount of metal element component belonging to the groups 8 to 11 of the periodic table in the solid catalysts refers to the amount of metal oxide or the like when the metal element belonging to the groups 8 to 11 of the periodic table is the metal oxide or the like. A metal element component content lower than the above range and a carrier content higher than the above range result in low hydrogenation efficiency due to an insufficient amount of metal element serving as a catalyst active component. A metal element component content higher than the above range and a carrier content lower than the above range result in low hydrogenation efficiency due to a decrease in catalyst strength.

The solid catalysts in the present invention may contain another metal element, provided that the solid catalysts contain a metal element belonging to the groups 8 to 11 of the periodic table. Examples of another optional metal element include chromium, manganese, zinc, magnesium, sodium, rhenium, and calcium. These metal elements may be the metal elements themselves, oxides, hydroxides, or various salts.

The amount of another metal component, if present, in the solid catalysts is typically 0.1% or more by mass, preferably 0.5% or more by mass, particularly preferably 1% or more by mass, and typically 20% or less by mass, preferably 15% or less by mass, particularly preferably 10% or less by mass.

Although the combined use of another metal component can improve catalytic activity, an excessively low amount of the other metal component cannot produce a sufficient combined effect. An excessively large amount of another metal component results in a relatively small amount of metal element of the groups 8 to 11 of the periodic table and a relatively small amount of carrier, which may decrease the inherent hydrogenation catalytic activity and selectivity of the solid catalysts in the present invention and may increase the amount of high-boiling by-products.

The solid catalysts may have any shape and size and may be a powder, granules, particles, pellets, or another formed product. The solid catalysts may have any size. For example, solid catalyst pellets preferably have a diameter in the range of 1 to 20 mm and a thickness in the range of 1 to 20 mm.

Such a solid catalyst can be produced by immersing a carrier in an aqueous solution of a metal salt of the groups 8 to 11 of the periodic table to load the metal salt on the carrier, followed by firing, and, if necessary, followed by shaping.

The reaction temperature for hydrogenation in the present invention is typically 0° C. or more, preferably 50° C. or more, particularly preferably 100° C. or more, and typically 200° C. or less, preferably 180° C. or less, particularly preferably 150° C. or less. An excessively high reaction temperature results in an increased amount of cyclic ether by-products or accelerated catalyst degradation. Furthermore, the amount of high-boiling by-products increases. An excessively low reaction temperature results in a very slow reaction and no desired purification effect.

The hydrogen gas pressure in the hydrogenation is typically 0.1 MPa or more, preferably 0.5 MPa or more, particularly preferably 1 MPa or more, and typically 100 MPa or less, preferably 10 MPa or less, particularly preferably 6 MPa or less, in gauge pressure. An excessively low hydrogen gas pressure results in a low reaction rate and low productivity. An excessively high hydrogen gas pressure results in an increase in the pressure load of the reactor and the compressor load and consequently a significant increase in construction costs.

The residence time of the reaction liquid based on the empty column in the hydrogenation reaction is typically 5 minutes or more, preferably 10 minutes or more, particularly preferably 30 minutes or more, and typically 20 hours or less, preferably 8 hours or less, particularly preferably 5 hours or less. The reaction proceeds little during an excessively short residence time. An excessively long residence time, for example, in a packed bed hydrogenation reactor results in a long catalyst packed bed, an increase in the cost of the reactor, an increase in the amount of catalyst, and consequently greatly decreased economic efficiency.

With respect to the reaction type, all of typical packed bed hydrogenation reactors with various solid catalysts, such as a fixed bed, a trickle bed, and a multi-tube type, can be used. Preferred reactors are fixed-bed reactors and trickle-bed reactors. Only one reactor may be used, or a plurality of reactors may be used in multiple stages.

In the hydrogenation of a crude polytetramethylene ether glycol, to facilitate the contact with a solid catalyst, the crude polytetramethylene ether glycol may be diluted with a solvent that is inactive in the reaction before the reaction. In such a case, one or two or more of methanol, toluene, and the like can be used as a diluent. From the perspective of miscibility with hydrogen, a crude polytetramethylene ether glycol is preferably diluted to a solid content in the range of approximately 5% to 95% by mass before the reaction.

A polyalkylene ether glycol composition according to the present invention can be produced through the step of decreasing the amount of acetal by hydrogenation with a solid catalyst. A polyalkylene ether glycol composition thus produced has a low acetal value, has fewer problems, such as coloring, and can be suitably used in various applications.

A polyalkylene ether glycol composition according to the present invention may be used for various applications described later after the step of decreasing the amount of acetal by hydrogenation and after purification, such as cation-exchange resin treatment or distillation, for decreasing the nitrogen-containing compound content.

[Applications of Polyalkylene Ether Glycol Composition]

A polyalkylene ether glycol composition according to the present invention can be used as a raw material for the production of elastic fibers, polyurethane, synthetic leather, thermoplastic elastomers, such as thermoplastic polyester elastomers and thermoplastic polyurethane elastomers, and coating materials.

EXAMPLES

Although the present invention is more specifically described in the following examples, the present invention is not limited to these examples without departing from the gist of the present invention.

[Molecular Weight Measurement Method]

The number-average molecular weight (Mn) of PTMG was analyzed by gel permeation chromatography (GPC). For calibration of GPC, a Polytetrahydrofuran calibration kit from Polymer Laboratories, UK was used.

[Acetal Value Measurement Method]

The acetal concentration of PTMG was determined by adding 10 mL of 1 N hydrochloric acid hydroxylamine hydrochloride to 10 g of a sample and neutralizing and titrating hydrochloric acid released from a reaction at 60° C. for 2 hours with a 0.1 N methanolic potassium hydroxide solution. In Comparative Example 2 and Examples 2 to 4, however, a nitrogen-containing compound contained reacts with the titration solution, and therefore it was determined by $^1$H NMR from the ratio of methylene hydrogens adjacent to a terminal PTMG hydroxy group to a methine hydrogen of the acetal structure. The acetal value was determined from the measured acetal concentration and was expressed in mg-KOH/g of the titrant.

[Peroxide Concentration Measurement Method]

The peroxide concentration of PTMG was determined by the following method. A sample was dissolved in ethanol. Acetic acid and a potassium iodide solution were added. The mixture was heated at 80° C. for 2 minutes and was then titrated with sodium thiosulfate until the solution became colorless. The peroxide concentration was calculated from the titer.

[Acid Value Measurement Method]

The acid value of PTMG was determined with a titrator from the titer of a potassium hydroxide solution using phenolphthalein as an indicator.

[Nitrogen Analysis Method]

The nitrogen-containing compound content of a sample was determined by burning the sample in an argon-oxygen atmosphere and analyzing the generated combustion gas with a trace nitrogen measuring apparatus (TN-10, manufactured by Mitsubishi Chemical Analytech Co., Ltd.) by a combustion and reduced-pressure chemiluminescence method. In Examples 3 and 4, the concentration in terms of nitrogen atoms was calculated from the amount of amine added.

[THF Analysis Method]

The concentration of THF in PTMG was determined by gas chromatography (apparatus: model number GC-2014, column DB-1, manufactured by Shimadzu Corporation) and was calculated by an internal standard method.

[Ring-Opening Polymerization Catalyst]

A ring-opening polymerization catalyst for THF was a catalyst produced by drying CARiACTQ15 (registered trademark) (a silica carrier manufactured by Fuji Silysia Chemical Ltd.) impregnated with a 27.2% aqueous solution of zirconia nitrate, neutralizing and washing the CARiACTQ15 with aqueous ammonium bicarbonate, and drying and firing the CARiACTQ15 at 900° C.

Preparation Example 1: Preparation of PTMG Containing Acetal

An air contact treatment was performed at room temperature and at atmospheric pressure for 24 hours while 500 g of tetrahydrofuran without an antioxidant manufactured by Mitsubishi Chemical Corporation was bubbled with air at a flow rate of 50 mL/min. 405 g of the tetrahydrofuran subjected to the air contact treatment, 49.5 g of acetic anhydride manufactured by Daicel Chemical Industries, Ltd., and 18 g of a ring-opening polymerization catalyst in a 500-mL glass flask reactor were allowed to react in a nitrogen atmosphere at a reaction temperature of 40° C. for 6 hours. The catalyst was separated from the reaction liquid by filtration, and 100 g of the resulting polymerization reaction liquid was put into a round-bottom glass flask including a stirring bar. The reaction liquid in the round-bottom flask was heated at atmospheric pressure and at a bath temperature of 170° C. for 2 hours while nitrogen was bubbled at a flow rate of 500 mL/min to distill off unreacted raw materials. Thus, approximately 120 g of PTME was produced.

Next, 100 g of the PTME, 200 g of methanol manufactured by Kanto Chemical Co., Inc., and 0.34 g of a 24% sodium methoxide methanol solution manufactured by Tokyo Chemical Industry Co., Ltd. were put into a separable glass flask. While stirring the liquid in the flask at 250 rpm, an oil bath was heated to 90° C., and 100 g of methanol was extracted after total reflux for 1 hour. When the internal temperature went down and reached 60° C. or less, 100 g of methanol was added, the oil bath was heated for total reflux for 1 hour, and then 100 g of methanol was extracted. 20 g of a sulfonic acid type strongly acidic cation-exchange resin (Diaion PK216) manufactured by Mitsubishi Chemical Corporation was added to the solution remaining in the flask to remove alkali. After the resin was removed by pressure filtration, the solvent was distilled off at 120° C. under reduced pressure of 0.2 MPa or less to produce PTMG-1.

The PTMG-1 had a number-average molecular weight of 2053 and an acetal value of 1.36 mg-KOH/g.

Preparation Example 2: Preparation of PTMG Containing Nitrogen 500 g of a styrene polyamine anion-exchange resin (Diaion WA20) manufactured by Mitsubishi Chemical Corporation was added to 500 g of tetrahydrofuran manufactured by Mitsubishi Chemical Corporation and was heated at 70° C. for approximately 24 hours in a 1-L stainless steel autoclave. The ion-exchange resin was then separated by filtration to prepare tetrahydrofuran containing a nitrogen-containing compound as an anion-exchange resin eluate. The recovered tetrahydrofuran contained a nitrogen-containing compound at a concentration of approximately 15 ppm in terms of nitrogen atoms.

PTME was produced by a ring-opening polymerization reaction in the same manner as in Preparation Example 1 except that tetrahydrofuran containing nitrogen was used as tetrahydrofuran, and PTMG-2 was produced in the same manner by a transesterification reaction of the PTME.

The PTMG-2 had a number-average molecular weight of 1802 and contained 4 mass ppm of a nitrogen-containing compound in terms of nitrogen atoms.

Preparation Example 3: Preparation of PTMG Containing High Concentration of Nitrogen 500 g of a styrene polyamine anion-exchange resin (Diaion WA20) manufactured by Mitsubishi Chemical Corporation was added to 500 g of tetrahydrofuran manufactured by Mitsubishi Chemical Corporation and was heated at 70° C. for approximately 72 hours in a 1-L stainless steel autoclave. The ion-exchange resin was then separated by filtration to prepare tetrahydrofuran containing a nitrogen-containing compound as an anion-exchange resin eluate. The recovered tetrahydrofuran contained a nitrogen-containing compound at a concentration of approximately 200 ppm in terms of nitrogen atoms.

300 g of tetrahydrofuran containing nitrogen and 100 g of PTMG (Mn=1800) manufactured by Mitsubishi Chemical Corporation in a round-bottom glass flask including a stirring bar were heated at atmospheric pressure and at a bath temperature of 170° C. for 2 hours while nitrogen was bubbled at a flow rate of 500 mL/min to distill off unreacted raw materials. Thus, approximately 100 g of PTMG-3 was produced.

The PTMG-3 had a number-average molecular weight of 1800 and contained 550 mass ppm of a nitrogen-containing compound in terms of nitrogen atoms.

In the following examples and comparative examples, the acetal of the PTMG composition is subjected to hydrogenolysis. When tetrahydrofuran produced by the hydrogenolysis is 300 mass ppm or less, it was judged that the decomposition of the polyalkylene ether glycol is less likely to produce a cyclic ether.

Comparative Example 1

15.6 g of the PTMG-1 produced in Preparation Example 1, 8.8 g of PTMG (Mn=1800) manufactured by Mitsubishi Chemical Corporation (hereinafter also referred to as a "product PTMG"), and 0.6 g of the PTMG-2 produced in Preparation Example 2 were mixed. The PTMG prepared by the mixing (hereinafter also referred to as the "mixed PTMG") had a number-average molecular weight of 1950 and a nitrogen-containing compound content of 0.1 mass ppm in terms of nitrogen atoms. Furthermore, 25 g of toluene manufactured by Kanto Chemical Co., Inc. was mixed to prepare a liquid mixture. The liquid mixture had an acetal value of 0.41 mg-KOH/g (the mixed PTMG had an acetal value of 0.82 mg-KOH/g).

The liquid mixture was transferred to a 100-mL stainless steel autoclave. Furthermore, 1 g of a catalyst containing 1.0% by mass of Pd supported on cylindrical activated carbon 3 mm in diameter and 3 mm in length was added to the liquid mixture. A hydrogenolysis reaction was performed at a hydrogen gas pressure of 0.7 MPaG and at 130° C. for 6 hours.

The liquid mixture after the reaction had an acetal value of 0.26 mg-KOH/g (the mixed PTMG after the reaction had an acetal value of 0.52 mg-KOH/g) and contained 492 mass ppm of tetrahydrofuran. The hydrogenolysis rate of the acetal is 36.6%.

Comparative Example 2

15.6 g of the PTMG-1 prepared in Preparation Example 1, 7.1 g of the product PTMG, and 2.3 g of the PTMG-3 prepared in Preparation Example 3 were mixed. The PTMG prepared by the mixing (hereinafter also referred to as the "mixed PTMG") had a number-average molecular weight of 1955 and a nitrogen-containing compound content of 50 mass ppm in terms of nitrogen atoms. Furthermore, 25 g of toluene manufactured by Kanto Chemical Co., Inc. was mixed to prepare a liquid mixture. The liquid mixture had an acetal value of 0.43 mg-KOH/g (the mixed PTMG had an acetal value of 0.86 mg-KOH/g).

The liquid mixture was subjected to the hydrogenolysis reaction in the same manner as in Comparative Example 1. The liquid mixture after the reaction had an acetal value of 0.43 mg-KOH/g (the mixed PTMG after the reaction had an acetal value of 0.86 mg-KOH/g) and contained 1166 mass ppm of tetrahydrofuran. The hydrogenolysis rate of the acetal is 0.0%.

Example 1

15.6 g of the PTMG-1 prepared in Preparation Example 1, 3.2 g of the product PTMG, and 6.2 g of the PTMG-2 prepared in Preparation Example 2 were mixed. The PTMG prepared by the mixing (hereinafter also referred to as the "mixed PTMG") had a number-average molecular weight of 1955 and a nitrogen-containing compound content of 1 mass ppm in terms of nitrogen atoms. Furthermore, 25 g of toluene manufactured by Kanto Chemical Co., Inc. was mixed to prepare a liquid mixture. The liquid mixture had an acetal value of 0.42 mg-KOH/g (the mixed PTMG had an acetal value of 0.84 mg-KOH/g).

The liquid mixture was subjected to the hydrogenolysis reaction in the same manner as in Comparative Example 1. The liquid mixture after the reaction had an acetal value of 0.24 mg-KOH/g (the mixed PTMG after the reaction had an acetal value of 0.48 mg-KOH/g) and contained 209 mass ppm of tetrahydrofuran. The hydrogenolysis rate of the acetal is 42.9%.

Example 2

15.6 g of the PTMG-1 prepared in Preparation Example 1, 8.3 g of the product PTMG, and 1.1 g of the PTMG-3 prepared in Preparation Example 3 were mixed. The PTMG prepared by the mixing (hereinafter also referred to as the "mixed PTMG") had a number-average molecular weight of 1950 and a nitrogen-containing compound content of 10 mass ppm in terms of nitrogen atoms. Furthermore, 25 g of toluene manufactured by Kanto Chemical Co., Inc. was mixed to prepare a liquid mixture. The liquid mixture had an acetal value of 0.43 mg-KOH/g (the mixed PTMG had an acetal value of 0.86 mg-KOH/g).

The liquid mixture was subjected to the hydrogenolysis reaction in the same manner as in Comparative Example 1. The liquid mixture after the reaction had an acetal value of 0.16 mg-KOH/g (the mixed PTMG after the reaction had an acetal value of 0.32 mg-KOH/g) and contained 280 mass ppm of tetrahydrofuran. The hydrogenolysis rate of the acetal is 62.8%.

Example 3

15.6 g of the PTMG-1 prepared in Preparation Example 1, 9.4 g of the product PTMG, and 0.015 g of diethylamine manufactured by Kanto Chemical Co., Inc. were mixed. The PTMG prepared by the mixing (hereinafter also referred to as the "mixed PTMG") had a number-average molecular weight of 1950 and a nitrogen-containing compound content of 10 mass ppm in terms of nitrogen atoms. Furthermore, 25 g of toluene manufactured by Kanto Chemical Co., Inc. was mixed to prepare a liquid mixture. The liquid mixture had an acetal value of 0.43 mg-KOH/g (the mixed PTMG had an acetal value of 0.86 mg-KOH/g).

The liquid mixture was subjected to the hydrogenolysis reaction in the same manner as in Comparative Example 1. The liquid mixture after the reaction had an acetal value of 0.18 mg-KOH/g (the mixed PTMG after the reaction had an acetal value of 0.36 mg-KOH/g) and contained 132 mass ppm of tetrahydrofuran. The hydrogenolysis rate of the acetal is 58.1%.

Example 4

15.6 g of the PTMG-1 prepared in Preparation Example 1, 9.4 g of the product PTMG, and 0.00075 g of diethylamine manufactured by Kanto Chemical Co., Inc. were mixed. The PTMG prepared by the mixing (hereinafter also referred to as the "mixed PTMG") had a number-average molecular weight of 1950 and a nitrogen-containing compound content of 0.5 mass ppm in terms of nitrogen atoms. Furthermore, 25 g of toluene manufactured by Kanto Chemical Co., Inc. was mixed to prepare a liquid mixture. The liquid mixture had an acetal value of 0.43 mg-KOH/g (the mixed PTMG had an acetal value of 0.86 mg-KOH/g), an acid value of 0.141 mg-KOH/g (the mixed PTMG had an acid value of 0.282 mg-KOH/g), and a peroxide concentration of 54.1 µg-$H_2O_2$/g (the mixed PTMG had a peroxide concentration of 108.2 µg-$H_2O_2$/g).

The liquid mixture was transferred to a 100-mL stainless steel autoclave. Furthermore, 1 g of a catalyst containing 1.0% by mass of Pd supported on cylindrical activated carbon 3 mm in diameter and 3 mm in length was added to the liquid mixture. A hydrogenolysis reaction was performed at a hydrogen gas pressure of 0.7 MPaG and at 130° C. for 12 hours. The liquid mixture after the reaction had an acetal value of 0.24 mg-KOH/g (the mixed PTMG after the reaction had an acetal value of 0.48 mg-KOH/g) and contained 72 mass ppm of tetrahydrofuran. The hydrogenolysis rate of the acetal is 44.6%.

Table 1 summarizes the results for Comparative Examples 1 and 2 and Examples 1 to 4. In Table 1, the concentration of the nitrogen-containing compound in terms of nitrogen atoms is referred to as "N concentration".

TABLE 1

| | Mixing ratio of PTMG etc. (g) | | | | | Molecular weight of mixed PTMG (Mn) | Mixed PTMG N concentration (mass ppm) |
|---|---|---|---|---|---|---|---|
| | PTMG-1 | PTMG Product | PTMG-2 | PTMG-3 | Diethylamine | | |
| Comparative example 1 | 15.6 | 8.8 | 0.6 | 0 | 0 | 1950 | 0.1 |
| Comparative example 2 | 15.6 | 7.1 | 0 | 2.3 | 0 | 1956 | 50 |
| Example 1 | 15.6 | 3.2 | 6.2 | 0 | 0 | 1955 | 1.0 |
| Example 2 | 15.6 | 8.3 | 0 | 1.1 | 0 | 1950 | 10 |
| Example 3 | 15.6 | 9.4 | 0 | 0 | 0.015 | 1950 | 10 |
| Example 4 | 15.6 | 9.4 | 0 | 0 | 0.00075 | 1950 | 0.5 |

| | Mixed PTMG acid value (mg-KOH/g) | Peroxide concentration of mixed PTMG ($\mu$g-H$_2$O$_2$/g) | Acetal value of mixed PTMG (mg-KOH/g) | Acetal value of mixed PTMG after reaction (mg-KOH/g) | Acetal hydrogenolysis rate (%) | THF in liquid reaction (mass ppm) |
|---|---|---|---|---|---|---|
| Comparative example 1 | | | 0.82 | 0.52 | 36.6 | 492 |
| Comparative example 2 | | | 0.86 | 0.86 | 0.0 | 1166 |
| Example 1 | | | 0.84 | 0.48 | 42.9 | 209 |
| Example 2 | | | 0.86 | 0.32 | 62.8 | 280 |
| Example 3 | | | 0.86 | 0.36 | 58.1 | 132 |
| Example 4 | 0.282 | 108.2 | 0.86 | 0.48 | 44.6 | 72 |

Table 1 shows that when the mixed PTMG has a nitrogen-containing compound content in the range of 0.2 to 40 mass ppm in terms of nitrogen atoms, this results in high hydrogenolysis efficiency of the acetal, high thermal stability in the hydrogenolysis reaction, and a small amount of a decomposition product tetrahydrofuran.

Although the present invention has been described in detail with reference to particular embodiments, it will be apparent to those skilled in the art that various modifications may be made therein without departing from the spirit and scope of the present invention.

The present application is based on Japanese Patent Application No. 2017-240465 filed on Dec. 15, 2017, which is incorporated herein by reference in its entirety.

The invention claimed is:

1. A polyalkylene ether glycol composition, comprising: a nitrogen-containing compound,
   wherein the nitrogen-containing compound constitutes 0.2 to 40 mass ppm of the polyalkylene ether glycol in terms of nitrogen atoms, and
   wherein the nitrogen-containing compound has a boiling point in a range of −40° C. to 120° C. at atmospheric pressure.

2. The polyalkylene ether glycol composition according to claim 1, wherein the nitrogen-containing compound is at least one selected from the group consisting of an amine and an amide.

3. The polyalkylene ether glycol composition according to claim 1, wherein the nitrogen-containing compound is an amine having two or more nitrogen atoms.

4. The polyalkylene ether glycol composition according to claim 1, wherein the nitrogen-containing compound is an anion-exchange resin eluate.

5. The polyalkylene ether glycol composition according to claim 1, wherein the nitrogen-containing compound has a molecular weight in a range of 17 to 500.

6. The polyalkylene ether glycol composition according to claim 1, further comprising:
   tetrahydrofuran,
   wherein the tetrahydrofuran constitutes 5 to 200 mass ppm of the polyalkylene ether glycol.

7. The polyalkylene ether glycol composition according to claim 1, having an acetal value in a range of 0.01 to 3.00 mg-KOH/g.

8. The polyalkylene ether glycol composition according to claim 1, having a peroxide concentration in a range of 0.01 to 200 $\mu$g-H$_2$O$_2$/g of the polyalkylene ether glycol.

9. The polyalkylene ether glycol composition according to claim 1, having an acid value in a range of 0.02 to 1.00 mg-KOH/g.

10. The polyalkylene ether glycol composition according to claim 1, having an antioxidant concentration in a range of 10 to 1000 mass ppm of the polyalkylene ether glycol.

11. A method for producing the polyalkylene ether glycol composition according to claim 1, comprising:
    decreasing an amount of acetal in the polyalkylene ether glycol composition.

12. The method for producing the polyalkylene ether glycol composition according to claim 11, wherein the amount of acetal in the polyalkylene ether glycol composition is decreased with a solid catalyst.

13. An elastic stretchable fiber, comprising:
    the polyalkylene ether glycol composition according to claim 1.

14. A polyurethane, comprising:
    the polyalkylene ether glycol composition according to claim 1.

15. A synthetic leather, comprising:
    the polyalkylene ether glycol composition according to claim 1.

16. A thermoplastic elastomer, comprising:
    the polyalkylene ether glycol composition according to claim 1.

* * * * *